United States Patent
Takenage et al.

(10) Patent No.: US 9,400,351 B2
(45) Date of Patent: Jul. 26, 2016

(54) MULTI-CORE FIBER

(71) Applicants: FUJIKURA LTD., Tokyo (JP);
NATIONAL UNIVERSITY CORPORATION HOKKAIDO UNIVERSITY, Sapporo-shi, Hokkaido (JP)

(72) Inventors: Katsuhiro Takenage, Sakura (JP);
Yusuke Sasaki, Sakura (JP); Shioichiro Matsuo, Sakura (JP); Kunimasa Saitoh, Sapporo (JP)

(73) Assignees: FUJIKURA LTD., Tokyo (JP);
NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 14/770,570

(22) PCT Filed: Feb. 27, 2014

(86) PCT No.: PCT/JP2014/054806
§ 371 (c)(1),
(2) Date: Aug. 26, 2015

(87) PCT Pub. No.: WO2014/133057
PCT Pub. Date: Sep. 4, 2014

(65) Prior Publication Data
US 2016/0004009 A1   Jan. 7, 2016

(30) Foreign Application Priority Data

Feb. 27, 2013  (JP) .................................. 2013-037809

(51) Int. Cl.
*G02B 6/02* (2006.01)
*G02B 6/036* (2006.01)

(52) U.S. Cl.
CPC ........ *G02B 6/02042* (2013.01); *G02B 6/03605* (2013.01)

(58) Field of Classification Search
None
See application file for complete search history.

(56) References Cited

U.S. PATENT DOCUMENTS

| 2012/0195563 A1* | 8/2012 | Takenaga et al. ... G02B 6/02042 385/126 |
| 2013/0308913 A1* | 11/2013 | Tanigawa et al. ... G02B 6/02042 385/126 |
| 2014/0178024 A1* | 6/2014 | Takenaga et al. ... G02B 6/02042 385/126 |
| 2015/0205053 A1* | 7/2015 | Aoki et al. ........... G02B 6/3877 385/61 |

* cited by examiner

FOREIGN PATENT DOCUMENTS

| JP | 2011-180243 A | | 9/2011 |
| JP | 2012-168453 A | * | 9/2012 |
| JP | 2012-181282 A | | 9/2012 |
| JP | 2013-33865 A | | 2/2013 |

OTHER PUBLICATIONS

Takenaga et al., "Reduction of Crosstalk by Quasi-Homogeneous Solid Multi-Core Fiber", OSA/OFC/NFOEC 2010, OWK7, (3 pages).
Imamura et al., "19-Core Multi Core Fiber to Realize High Density Space Division Multiplexing Transmission", In Proc. IEEE Photon. Soc. Summer Topical Meeting 2012, TuC 4.3 (2012), pp. 208-209.
Takenaga et al., "Reduction of Crosstalk by Trench-Assisted Multi-Core Fiber", OSA/OFC/NFOEC 2011, OWJ4, (3 pages).
Okuyama et al., "Investigation on Circularly Arranged Multi-Core Fibers for Increasing the Number of Cores", The Institute of Electronics Information and Communication Engineers, Sogo Taikai Koen Ronbunshu, 2012 Nen Tsushin (2), Mar. 6, 2012, p. 547.
International Search Report dated May 27, 2014, issued in counterpart Application No. PCT/JP2014/054806 (2 pages).

*Primary Examiner* — Mike Stahl
(74) *Attorney, Agent, or Firm* — Westerman, Hattori, Daniels & Adrian, LLP

(57) ABSTRACT

A multi-core fiber (1) is a multi-core fiber including 10 or greater of even numbered cores and a cladding surrounding the core. In the even numbered cores, a half of cores (11a) are disposed in such a manner that centers are located on the apexes of a regular polygon (RP) whose center is at an origin point (O) in a cladding (20). In the even numbered cores, other cores (11b) are disposed in a manner that centers are located on perpendicular bisectors (LV) of the edges of a regular polygon on the inner side of the regular polygon (RP). The other cores (11b) are disposed in a specific range in the regular polygon (RP).

6 Claims, 4 Drawing Sheets

MULTI-CORE FIBER

TECHNICAL FIELD

The present invention relates to a multi-core fiber that can suppress crosstalk.

BACKGROUND ART

Presently, optical fibers for use in generally widely available optical fiber communication systems have a structure in which the outer circumference of a single core is surrounded by a cladding, and optical signals are propagated through the inside of this core to transmit information. In these years, information volumes to be transmitted are dramatically increased in association with the widespread use of optical fiber communication systems.

In order to realize an increase in the transmission capacity of these optical fiber communication systems, it is known that a multi-core fiber is used in which the outer circumferences of a plurality of cores are surrounded by a single cladding, and a plurality of signals is transmitted on light propagated through each of the cores.

Non Patent Literature 1 below describes an example of a multi-core fiber. In the multi-core fiber described in Non Patent Literature below, a single core is disposed in the center of a cladding, and six cores are disposed at regular spacings so as to surround this single core. In other words, the cores are disposed in a 1-6 configuration. Moreover, such a multi-core fiber is known in which cores are disposed in a 1-6-12 configuration (see Non Patent Literature 2 described below). In the multi-core fibers described in these Non Patent Literatures, the cores are disposed on the lattice points of a triangular lattice in such a manner that the cores are closely packed and disposed.

Furthermore, a trench type multi-core fiber is known in which each of the cores is surrounded by a low refractive index portion called a trench portion and a core element is formed to include the core and the low refractive index portion. According to this trench type multi-core fiber, light propagated through the cores is strongly confined in the cores. Therefore, it is suppressed that light propagated through each of the cores is leaked to the outside of each of the core elements, and the crosstalk between the cores can be decreased (see Non Patent Literature 3 described below).

[Non Patent Literature 1] K. Takenaga et al., "Reduction of crosstalk by quasi-homogeneous solid multi-core fiber," OFC 2010, OWK 7 (2010)

[Non Patent Literature 2] K. Imamura et al., "19-core multi core fiber to realize high density space division multiplexing transmission," in Proc. IEEE Photon. Soc. Summer Topical Meeting 2012, TuC 4.3 (2012)

[Non Patent Literature 3] K. Takenaga et al., "Reduction of crosstalk by trench-assisted multi-core fiber," OFC 2011, OWJ4 (2011)

SUMMARY OF INVENTION

However, in the case where cores are disposed as described in Patent Literatures 1 to 3 above, since the core disposed in the center is surrounded by a plurality of cores on the outer circumferential side, crosstalk is prone to occur between the center core and the cores on the outer circumferential side. This is similarly applied to the multi-core fiber in Non Patent Literature 3 in which crosstalk can be decreased. Moreover, in the multi-core fiber in Non Patent Literature 3, in a specific core element surrounded by the other core elements, such a tendency is observed that the cutoff wavelength is prone to increase because of the influence of confinement in a higher mode caused by a plurality of the core elements surrounding the specific core element, and it is pointed out that the communication quality of the specific core is prone to deteriorate. For example, when the core elements are disposed in a 1-6 configuration, such a tendency is observed that the cutoff wavelength of the center core is prone to increase.

Therefore, it is an object of the present invention to provide a multi-core fiber that can suppress crosstalk.

In order to achieve the above-described object, a multi-core fiber of the present invention includes: 10 or greater of even numbered cores; and a cladding surrounding the core, wherein in the even numbered cores, a half of the cores are disposed in a manner that centers are located on apexes of a regular polygon whose center is at an origin point in the cladding, in the even numbered cores, other cores other than the half of the cores are disposed in a manner that centers are located on perpendicular bisectors of edges of the regular polygon on an inner side of the regular polygon, and an expression below is satisfied where a number of even numbered cores is defined as n and a size of an acute angle formed of a line connecting a center of a core on which attention is focused in the half of the cores to a center of a core in the other cores adjacent to the core on which attention is focused and a line connecting the center of the core on which attention is focused to the origin point is defined as $\phi$.

$$\tan^{-1}\left(\frac{\tan\frac{360°}{n}\cdot\sin\frac{360°}{2n}}{\tan\frac{360°}{n}-\sin\frac{360°}{2n}}\right) < \phi < 90° - \frac{540°}{n}$$

In order to suppress the crosstalk of a core disposed in the center, the present inventors investigated that no core is disposed in the center of a cladding and cores are disposed in a regular polygonal shape. In this case, when the number of the entire cores is the same, the number of cores disposed in a regular polygonal shape is increased as compared with the number of cores disposed on the outer circumferential side of a multi-core fiber in which a core is disposed in the center of a cladding. On this account, in the case where the outer diameter of the cladding is the same, such a problem arose that a smaller core pitch rather degrades crosstalk as compared with the crosstalk of the cores disposed on the outer circumferential side of the multi-core fiber in which the core is disposed in the center of the cladding. On the other hand, in the case where the crosstalk of the cores disposed on the outer circumferential side of the multi-core fiber in which the core is disposed in the center of the cladding is made equal to the crosstalk of the cores disposed in a regular polygonal shape, such a problem arose that the outer diameter of the cladding is increased. However, in accordance with the multi-core fiber according to the present invention, the expression above is satisfied, so that the pitch between the cores adjacent to each other can be increased as compared with the case where all of the even numbered cores described above are disposed in a ring shape. Therefore, crosstalk can be decreased. It is noted that although the other cores are disposed on the inner circumferential side of a half of the cores, no core is disposed in the center of the cladding, and the cores are unevenly distributed on the outer circumferential side in such a manner that each of the other cores see the outer circumferential side between a half of the cores disposed on the outer circumferential side. Therefore, the cores on the inner circumferential side are not surrounded by a large number of cores, and it is possible to suppress the degradation of the crosstalk of the cores disposed on the inner circumferential side.

Moreover, it is preferable that each of the cores is surrounded by an inner cladding layer whose refractive index is lower than a refractive index of the core, and a low refractive index layer whose average refractive index is lower than refractive indexes of the cladding and the inner cladding layer, the low refractive index layer being surrounded by the cladding together with the inner cladding layer.

According to this multi-core fiber, optical confinement power to the cores is increased because of the low refractive index layers, so that it is possible to further suppress crosstalk.

The low refractive index layer may be formed of materials of a refractive index lower than the refractive indexes of the cladding and the inner cladding layer. In this case, each of the cores may be formed of pure silica.

The low refractive index layer may be formed in a manner that a plurality of low refractive index portions is formed to surround the inner cladding layer in a material whose refractive index is the same as the refractive index of the cladding, the low refractive index portion having a refractive index lower than the refractive index of the inner cladding layer.

It is preferable that an outer diameter of the cladding is 230 μm or less.

This outer diameter of the cladding is provided, it is possible to decrease the failure probability even in the case where the multi-core fiber is formed of silica, and the multi-core fiber is bent and used.

As described above, according to the present invention, there is provided a multi-core fiber that can suppress crosstalk.

DESCRIPTION OF EMBODIMENTS

Figure 1:
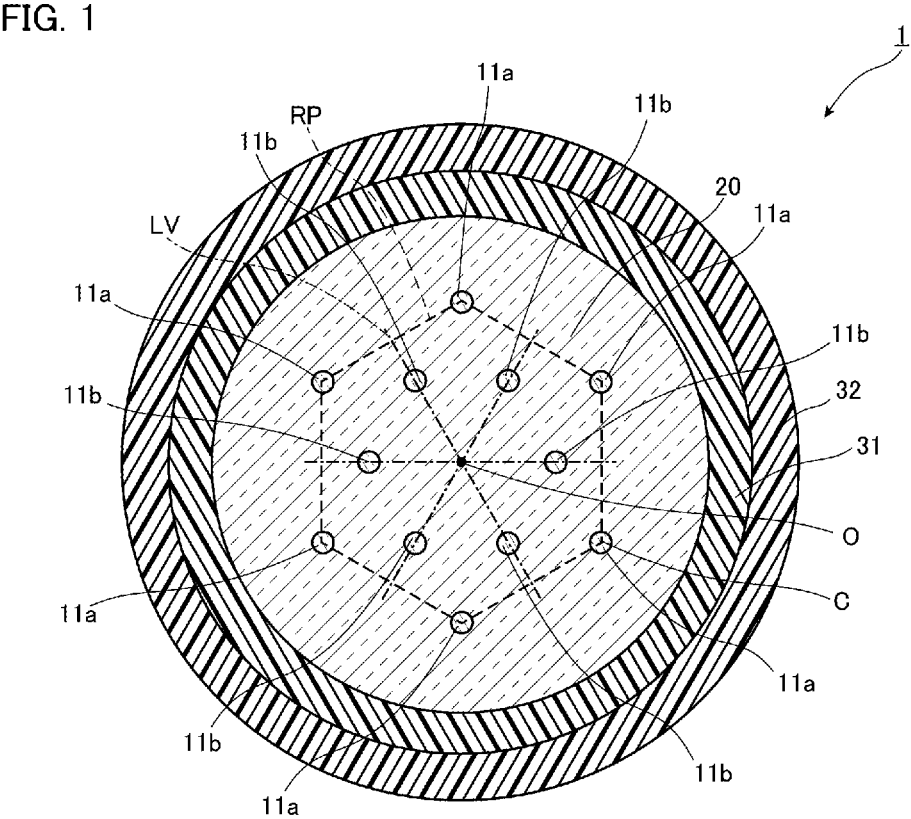
FIG. 1 is a diagram of the appearance of a multi-core fiber according to a first embodiment of the present invention.

In the following, preferred embodiments of a multi-core fiber according to the present invention will be described in detail with reference to the drawings. It is noted that for easy understanding, the scales in the drawings are sometimes different from the scales described in the following description.

First Embodiment

FIG. 1 is a diagram of the appearance of a multi-core fiber according to a first embodiment of the present invention. As illustrated in FIG. 1, a multi-core fiber 1 according to the embodiment includes cores formed of a plurality of cores 11a and a plurality of cores 11b whose number is an even number of 10 or greater, a cladding 20 that encloses the outer circumferential surface of each of the cores 11a and 11b with no gap, an inner protective layer 31 that covers the outer circumferential surface of the cladding 20, and an outer protective layer 32 that covers the outer circumferential surface of the inner protective layer 31. In FIG. 1, the case is illustrated where 12 cores are provided.

The cores 11a and 11b have the same configurations to each other. The refractive index of each of the cores 11a and 11b is made higher than the refractive index of the cladding 20. For example, in the case where the cores 11a and 11b are formed of silica doped with a dopant such as germanium that increases the refractive index, the cladding 20 is formed of pure silica, for example. In the case where the cores 11a and 11b are formed of pure silica, for example, the cladding 20 is formed of silica doped with a dopant such as fluorine that decreases the refractive index.

The cores 11a, which is a half of all the cores, are disposed in such a manner that the center of each of the cores 11a is located on apexes C of a regular polygon RP depicted by a broken line as an origin point O of the cladding 20 is in the center. In this manner, the cores 11a are disposed in a regular polygonal shape as the origin point O of the cladding 20 is in the center. FIG. 1 is the case where the number of the entire cores is 12, the number of the cores 11a is six, and the cores 11a are disposed in a regular hexagonal shape. It is noted that in the embodiment, the origin point O is set at the center point of the cladding 20.

Moreover, in all the cores, the other cores 11b are a remaining half of the cores other than the cores 11a, and are disposed on the inner side of the regular polygon RP formed of the cores 11a. In other words, the cores 11a are disposed on the outer circumferential side of the cladding 20, and the cores 11b are disposed on the inner circumferential side of the cladding 20. More specifically, the cores 11b are disposed in such a manner that the center of each of the cores 11b is located on perpendicular bisectors LV of the edges of the regular polygon RP.

As described above, no core is disposed in the center of the cladding 20, and the cores are unevenly distributed on the outer circumferential side in such a manner that each of the cores 11b on the inner circumferential side sees the outer side of the regular polygon RP from between the cores 11a on the outer circumferential side, so that any cores are not surrounded by many cores.

Next, which range on the perpendicular bisectors LV the core 11b is disposed will be described. It is noted that in this description, attention is focused on a certain core 11a, and the range in which the core 11a and the core 11b adjacent to the core 11a are disposed will be described. However, the same thing is applied even though attention is focused on any of the cores 11a.

Figure 2:
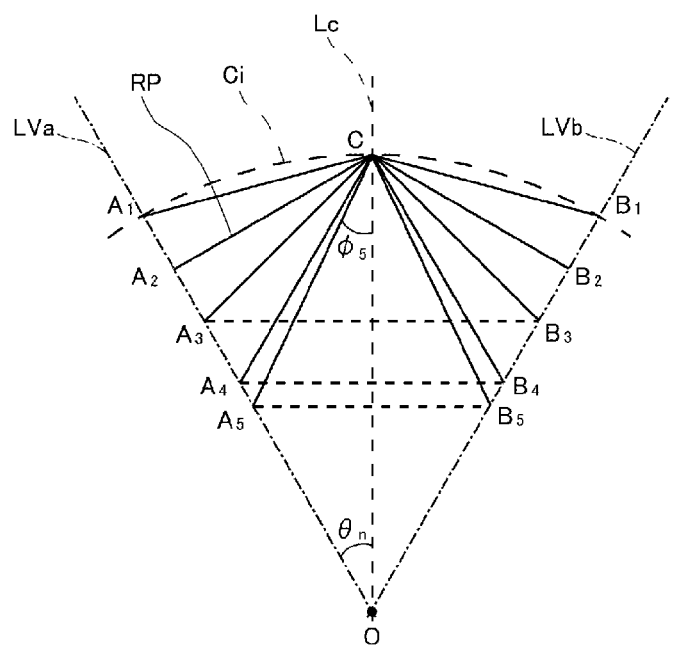
FIG. 2 is a diagram of a range in which the center of a core on the inner circumferential side is located.

FIG. 2 is a diagram illustrative of the range in which the center of the core 11b on the inner circumferential side is located. In FIG. 2, a circle Ci that passes through the apexes of the regular polygon RP whose center is at the origin point O is depicted by a broken line, and each of the perpendicular bisectors of two adjacent edges of the regular polygon RP is denoted as LVa and LVb. In this case, suppose that the size of an angle formed of a straight line Lc connecting an apex C of the regular polygon RP to the origin point O and the perpendicular bisector LVa is defined as $\theta_n$. In the case where the number of the entire cores of the multi-core fiber 1 including the cores 11a and the cores 11b is defined as n, an expression is held.

$$\theta_n = \frac{360°}{n} \quad (1)$$

Moreover, an angle formed of the straight line Lc and the perpendicular bisector LVb is also $\theta_n$ because of symmetry.

Subsequently, suppose that in the case where the centers of all the cores 11a and 11b of the multi-core fiber 1 are disposed on the apexes of the same regular polygon, the core 11b has the center on the intersection point of the circle Ci with the perpendicular bisector LV. Therefore, two cores 11b among the cores 11b illustrated in FIG. 2 are disposed in such a manner that the centers of the cores are located at an intersection point $A_1$ of the circle Ci with the perpendicular bisector LVa and an intersection point $B_1$ of the circle Ci with the perpendicular bisector LVb. In this case, the core 11a and the cores 11b are adjacent to each other. Therefore, suppose that the core pitch between the adjacent cores 11a and 11b is defined as $\Lambda$ in the case where the size of the radius of the circle Ci is defined as R and the centers of all the cores 11a and 11b are disposed on the apexes of the same regular polygon, Expression (2) described below is held. In the following, this core pitch $\Lambda$ is used for the reference of the core pitch.

$$R = \frac{\Lambda}{2\sin\frac{\theta_n}{2}} \quad (2)$$

Here, in FIG. 2, the point $A_2$ is the intersection point of the perpendicular bisector LVa with the edge of the regular polygon RP, and the point B: is the intersection point of the perpendicular bisector LVb with the edge of the regular polygon RP. Moreover, a point $A_3$ is a point of symmetry relative to the edge of the regular polygon RP at the intersection point $A_1$, and a point $B_3$ is a point of symmetry relative to the edge of the regular polygon RP at the intersection point $B_1$. Therefore, a distance from the point $A_3$ to the apex C and a distance from the point $B_3$ to the apex C are equal to a distance from the point $A_1$ to the apex C and a distance from the point $B_1$ to the apex C, and the distances take $\Lambda$. Moreover, a point $A_4$ is a point on the perpendicular bisector LVa in the case where an acute angle formed of a line connecting the point on the perpendicular bisector LVa to the apex C and the straight line Lc is an angle of 30°, and a point $B_4$ is a point on the perpendicular bisector LVb in the case where an acute angle formed of a line connecting the point on the perpendicular bisector LVb to the apex C and the straight line Lc is an angle of 30°. Furthermore, a point $A_5$ and a point $B_5$ are a point on the perpendicular bisector LVa and a point on the perpendicular bisector LVb in the case where two ends of a straight line in a length $\Lambda$ perpendicular to the straight line Lc are located on the perpendicular bisectors LVa and LVb.

Here, suppose that a point expressing any one of the points $A_1$ to $A_5$ is defined as a point $A_i$ (i=any one of 1, 2, 3, 4, and 5), and a point expressing any one of the points $B_1$ to $B_5$ is defined as a point $B_i$ (i=any one of 1, 2, 3, 4, and 5). In the case where the size of an angle formed of a line connecting the point $A_i$ to the apex C and the straight line Lc is defined as $\phi_i$, $\phi_i$ is equal to the size of an angle formed of a line connecting the point $B_i$ to the apex C to the straight line Lc because of symmetry. In this case, suppose that the distance from the point $A_i$ to the point $B_i$ is $A_iB_i$, $A_iB_i$ is expressed by Expression (3) below.

$$A_iB_i = 2R\frac{\tan\phi_i \cdot \tan\theta_n}{\tan\phi_i + \tan\theta_n} \quad (3)$$

Here, in the case where i is 1, $\phi_1$ is expressed by Expression (4) below.

$$\phi_1 = \frac{180° - \frac{360°}{n}}{2} = 90° - \frac{180°}{n} \quad (4)$$

Moreover, in the case where i is 2, $\phi_2$ is expressed by Expression (5) below.

$$\phi_2 = \frac{180° - \frac{720°}{n}}{2} = 90° - \frac{360°}{n} \quad (5)$$

Furthermore, in the case where i is 3, $\phi_3$ is expressed by Expression (6) below.

$$\phi_3 = \frac{180° - \frac{1080°}{n}}{2} = 90° - \frac{540°}{n} \quad (6)$$

In addition, in the case where i is 4, $\phi_4$ is expressed by Expression (7) below.

$$\phi_4 = 30° \quad (7)$$

Since $A_5B_5=\Lambda$ because of the definition of the points $A_5$ and $B_5$ described above, $\phi_5$ satisfies Expression (8) below.

$$\tan\phi_5 = \frac{\tan\theta_n \cdot \sin\frac{\theta_n}{2}}{\tan\theta_n - \sin\frac{\theta_n}{2}} \quad (8)$$

Therefore, $\phi_5$ is expressed by Expression (9) below.

$$\phi_5 = \tan^{-1}\left(\frac{\tan\theta_n \cdot \sin\frac{\theta_n}{2}}{\tan\theta_n - \sin\frac{\theta_n}{2}}\right) \quad (9)$$

Meanwhile, when cores are disposed in a multi-core fiber in such a manner that a core is located in the center of a cladding like a 1-6 configuration, such a tendency is observed that the crosstalk of the core disposed in the center deteriorates as described above. Therefore, a conclusion is reached that it is not desired to dispose a core in the center. In this case, it can be thought that all the cores are disposed in a regular polygonal shape. However, as a result of the investigation conducted by the present inventors, a conclusion was reached that the other half of the cores 11b is disposed on the inner side of the regular polygon RP formed by connecting the centers of a half of the cores 11a, so that the core pitch between the cores adjacent to each other is possibly increased as compared with the case where all the cores are disposed in a regular polygonal shape as described above.

In other words, attention is focused on the fact that the distance from the point $A_1$ to the apex C is equal to the distance from the point $A_3$ to the apex C and the distance from the point $B_1$ to the apex C is equal to the distance from the point $B_3$ to the apex C in the case where the core 11b is located on the outermost circumferential side, and in order to increase the core pitch between the core 11a and the core 11b more than Λ, it is fine that the center of the core 11b is located on the origin point side beyond the point $A_3$ and the point $B_3$. Moreover, when the center of the core 11b is too close to the origin point side, the core pitch between the cores 11b is Λ or smaller. Therefore, in order to increase the core pitch between the cores 11b more than Λ, it is fine that the center of the core 11b is located on the outer circumferential side beyond the point $A_5$ and the point $B_5$.

Therefore, in order to increase the core pitch between the cores adjacent to each other more than Λ in the case where the size of an angle formed of a line connecting a given point on the perpendicular bisector LVa to the apex C and the straight line Lc is defined as φ, it is fine to satisfy Expression (10) below by Expression (6) and Expression (9).

$$\tan^{-1}\left(\frac{\tan\theta_n \cdot \sin\frac{\theta_n}{2}}{\tan\theta_n - \sin\frac{\theta_n}{2}}\right) < \phi < 90° - \frac{540°}{n} \quad (10)$$

When Expression (1) is applied to Expression (10), Expression (11) below is held.

$$\tan^{-1}\left(\frac{\tan\frac{360°}{n} \cdot \sin\frac{360°}{2n}}{\tan\frac{360°}{n} - \sin\frac{360°}{2n}}\right) < \phi < 90° - \frac{540°}{n} \quad (11)$$

It is noted that it may be fine that φ is between $\phi_3$ and $\phi_4$, or on $\phi_4$, or between $\phi_4$ and $\phi_5$.

Here, in the case where the core pitch Λ between the cores adjacent to each other is 1 in the multi-core fiber in which each of the centers of the cores is disposed on the apexes of the same regular polygon, Table 1 below is $\theta_n$, R, $A_3B_3$, $A_4B_4$, $\phi_3$, $\phi_5$ in the multi-core fiber in which the cores are disposed as in the embodiment. It is noted that in Table 1 described below, the case is shown in the case where the number of the entire cores ranges from 6 to 18.

TABLE 1

| n | $\theta_n$ | R | $A_3B_3$ | $A_4B_4$ | $\phi_3$ | $\phi_5$ |
|---|---|---|---|---|---|---|
| 6 | 60 | 1.00 | 0.00 | 0.87 | — | — |
| 8 | 45 | 1.31 | 0.77 | 0.96 | — | — |
| 10 | 36 | 1.62 | 1.18 | 1.04 | 36.0 | 28.3 |
| 12 | 30 | 1.93 | 1.41 | 1.12 | 45.0 | 25.1 |
| 14 | 25.71 | 2.25 | 1.56 | 1.18 | 51.4 | 22.5 |
| 16 | 22.5 | 2.56 | 1.66 | 1.24 | 56.3 | 20.2 |
| 18 | 20 | 2.88 | 1.73 | 1.29 | 60.0 | 18.4 |

As apparent from Table 1 above, in the case where n≥10, the distance $A_3B_3$ between the point $A_3$ and the point $B_3$ is greater than Λ=1, and 10 or more of cores are necessary for the number of the entire cores 11a and 11b. Therefore, as described above, the number of the cores of the multi-core fiber 1 is an even number of 10 or greater for the entire cores. The cores 11b of the multi-core fiber 1 are disposed so as to satisfy Expression (11) above, so that the core pitch between the cores adjacent to each other can be increased more than in the case where the centers of the entire cores are disposed on the apexes of the same regular polygon. Therefore, according to the multi-core fiber 1 as described above, crosstalk can be decreased because the core pitch between the cores adjacent to each other is large. Moreover, in the case where the core pitch is constant, the outer diameter of the cladding can be decreased.

Next, the outer diameter of the cladding of the multi-core fiber 1 will be described.

Figure 3:
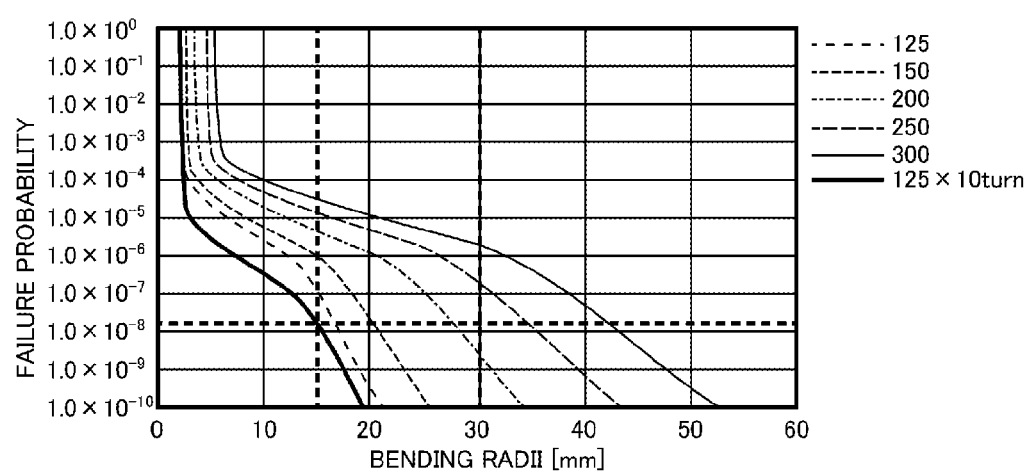
FIG. 3 is a diagram of the relationship between the bending radii of the optical fiber and the failure probability.

FIG. 3 is a diagram of the bending radii and failure probability of an optical fiber formed of silica. FIG. 3 is the cumulative failure probability for 20 years for the cladding diameters of optical fibers in the case where the optical fibers are wound for 100 turns at the bending radii. Here, the proof distortion was calculated as 1.5%. Presently, the diameter of the optical fiber used for communications is 125 μm. This optical fiber is a fiber resistant to bending, and the failure probability is determined as about $1.39 \times 10^{-8}$ when the optical fiber is wound for 10 turns at a bending radius of 15 mm. In FIG. 3, the failure probability are illustrated for an optical fiber whose outer diameter of the cladding is 125 μm as well when the optical fiber is wound for 10 turns at the bending radii. Meanwhile, suppose that for the reliability demanded on a communication optical fiber whose outer diameter of the cladding is greater than 125 μm, the cumulative failure probability for 20 years is $1.39 \times 10^{-8}$, in the case where the optical fiber is wound for 100 turns at the bending radius of 30 mm. It is revealed that the upper limit of the outer diameter of the cladding more allowable than the values in FIG. 3 is 230 μm. Therefore, when the outer diameter of the cladding is 230 μm or less, the reliability can be more improved.

Second Embodiment

Next, a second embodiment of the present invention will be described in detail with reference to FIG. 4. It is noted that components the same as or equivalent to the components of the first embodiment are designated the same reference signs, and the overlapping description will be omitted unless otherwise specified.

Figure 4:
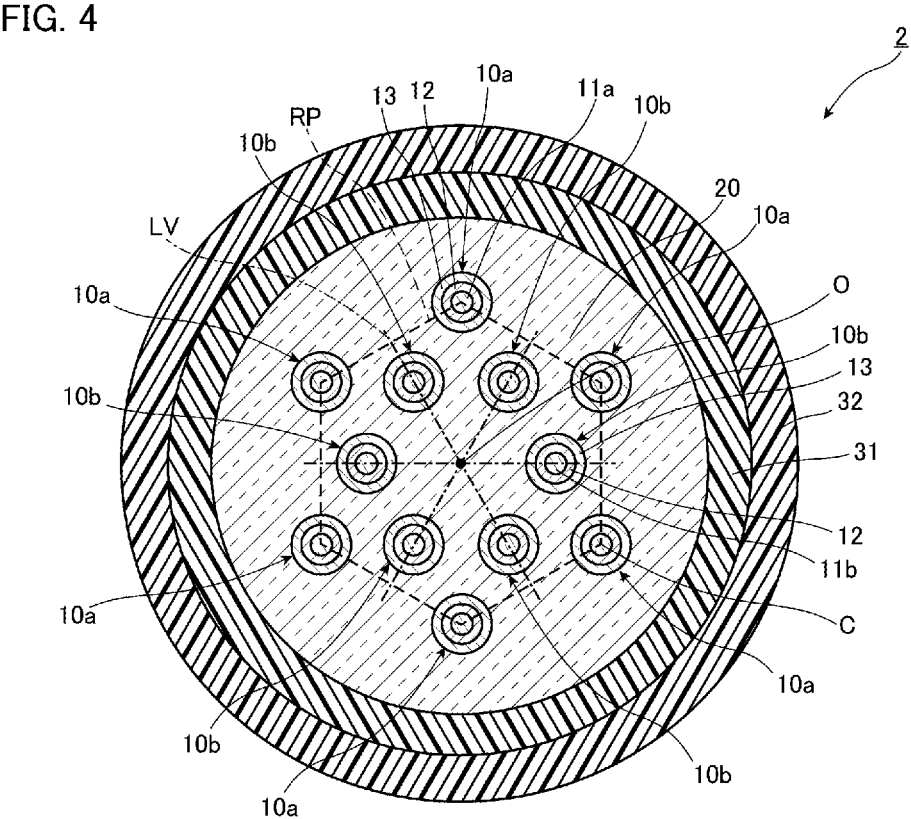
FIG. 4 is a diagram of the appearance of a multi-core fiber according to a second embodiment of the present invention.

FIG. 4 is a cross sectional view of a multi-core fiber according to the second embodiment of the present invention. As illustrated in FIG. 4, a multi-core fiber 2 according to the embodiment includes a plurality of core elements 10a and a plurality of core elements 10b, and the multi-core fiber 2 is different from the multi-core fiber 1 according to the first embodiment in that cores 11a are individually disposed in the inside of each of the core elements 10a and cores 11b are individually disposed in the inside of each of the core elements 10b.

The core element 10a includes the core 11a similarly disposed as the core 11a of the first embodiment, an inner cladding layer 12 that encloses the outer circumferential surface of the core 11a, and a low refractive index layer 13 that encloses the outer circumferential surface of the inner cladding layer 12 and has an outer circumferential surface enclosed by a cladding 20. The core element 10b includes the core 11b similarly disposed as the core 11b of the first embodiment, an inner cladding layer 12 that encloses the outer circumferential surface of the core 11b, and a low refractive index layer 13 that encloses the outer circumferential surface of the inner cladding layer 12 and has an outer circumferential surface enclosed by the cladding 20. As described in the first embodiment, since the cores 11a and 11b have the same configurations to each other, the core elements 10a and the core elements 10b have the same configurations to each other. Each of the cores 11a and 11b are disposed at the same positions as the positions of each of the cores 11a and 11b of the multi-core fiber 1 according to the first embodiment.

Moreover, in the case where the refractive indexes of the cores 11a and 11b are defined as $n_1$, a refractive index n; of the inner cladding layer 12 is made lower than refractive indexes $n_1$ of the cores 11a and 11b, and a refractive index $n_3$ of the low refractive index layer 13 is made further lower than the refractive index $n_2$ of the inner cladding layer 12. Furthermore, a refractive index $n_4$ of the cladding 20 is made lower than the refractive indexes $n_1$ of the cores 11a and 11b and higher than the refractive index $n_3$ of the low refractive index layer 13. In other words, the refractive indexes $n_1$ to $n_4$ satisfy all of expressions described below.

$$n_1 > n_2 > n_3$$

$$n_1 > n_4$$

$$n_4 > n_3$$

Therefore, in the case where the core elements 10a and 10b are seen from the viewpoint of the refractive indexes, the core elements 10a and 10b have a trench structure.

As described above, the refractive index $n_3$ of the low refractive index layer 13 is made smaller than the refractive index $n_2$ of the inner cladding layer 12 and smaller than the refractive index $n_4$ of the cladding 20, so that the effect of optical confinement on the cores 11a and 11b is improved, and it can be suppressed that light propagated through the cores 11a and 11b is leaked from each of the core elements 10a and 10b. The low refractive index layer 13 and the cladding 20 having low refractive indexes are barriers, and the crosstalk between the cores adjacent to each other can be further suppressed.

Moreover, in the trench type multi-core fiber, when a core element is disposed in the center, such a tendency is observed that the cutoff wavelength of the core disposed in the center is prone to increase because of the influence of confinement in a higher mode caused by a plurality of core elements surrounding the core disposed in the center. However, in accordance with the multi-core fiber 2 according to the embodiment, the core elements are unevenly distributed on the outer circumferential side in such a manner that the core elements 10b on the inner circumferential side see the outer side of the regular polygon RP between the core elements 10a on the outer circumferential side, so that any of the core elements are not surrounded by many core elements. Therefore, in any of the core elements, it is possible to suppress an increase in the cutoff wavelength.

Third Embodiment

Next, a third embodiment according to the present invention will be described in detail with reference to FIG. 5. It is noted that components the same as or equivalent to the components of the second embodiment are designated the same reference signs, and the overlapping description will be omitted unless otherwise specified.

Figure 5:
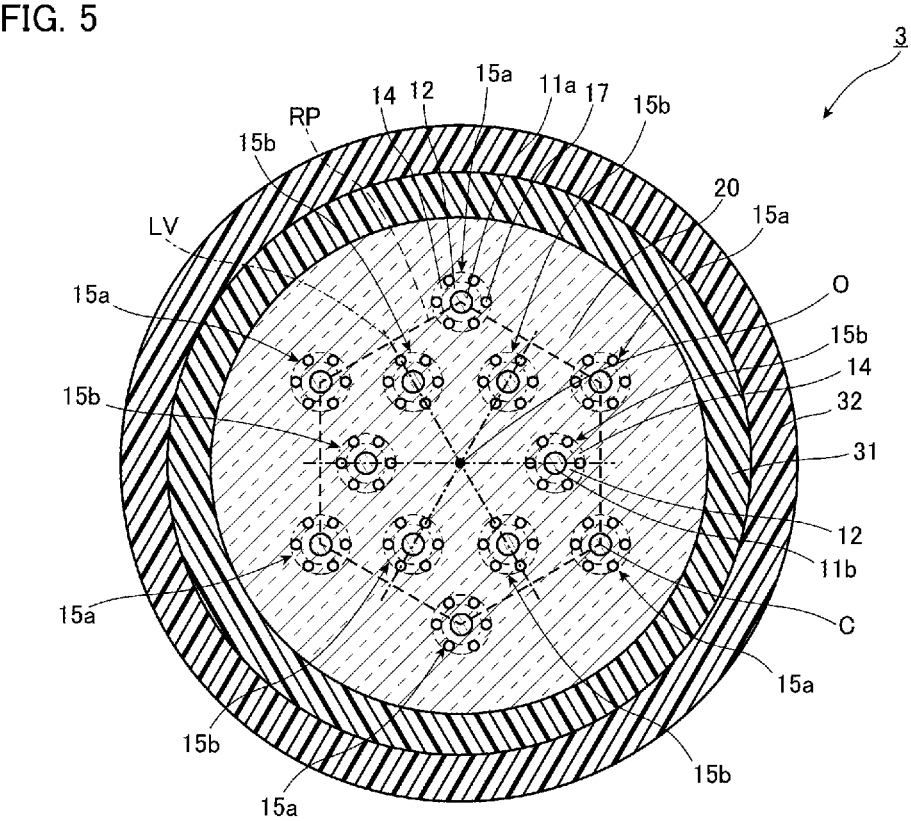
FIG. 5 is a diagram of the appearance of a multi-core fiber according to a third embodiment of the present invention.

FIG. 5 is a diagram of the appearance of a multi-core fiber 3 according to the third embodiment of the present invention. As illustrated in FIG. 5, a multi-core fiber 3 according to the embodiment is different from the multi-core fiber 2 according to the second embodiment in that the multi-core fiber 3 includes core elements 15a disposed at the same positions as the core elements 10a instead of the core elements 10a of the second embodiment, and core elements 15b disposed at the same positions as each of the core elements 10b instead of each of the core elements 10b according to the second embodiment.

As illustrated in FIG. 5, the core elements 15a and the core elements 15b have the same structures to each other. Each of core elements 15a includes a core 11a, an inner cladding layer 12 that encloses the outer circumferential surface of the core 11a, and a low refractive index layer 14 that encloses the outer circumferential surface of the inner cladding layer 12 and has an outer circumferential surface surrounded by a cladding 20. Moreover, each the core elements 15b includes a core 11b, an inner cladding layer 12 that encloses the outer circumferential surface of the cores 11b, and a low refractive index layer 14 that encloses the outer circumferential surface of the inner cladding layer 12 and has an outer circumferential surface surrounded by a cladding 20.

Each of the low refractive index layers 14 is formed of the same material as the martial of the cladding 20, and a plurality of low refractive index portions 17 whose refractive index is lower than the refractive index of the inner cladding layer 12 is formed in such a manner that the low refractive index portions 17 surround the inner cladding layer 12. In the embodiment, a plurality of holes in a circular shape is formed in the low refractive index layer 14, and the hole is the low refractive index portion 17. Since the low refractive index portion 17 is a hole, the refractive index of the low refractive index portion 17 is 1 and lower than the refractive indexes of the inner cladding layer 12 and the cladding 20, the average refractive index of the low refractive index layers 14 is made lower than the refractive indexes of the inner cladding layer 12 and the cladding 20.

It is noted that as described above, although regions other than the low refractive index portion 17 of the low refractive index layer 14 are formed of the material similar to the materials of the inner cladding layer 12 and the cladding 20, and originally have no boundaries. However, in FIG. 3, the boundaries are depicted by broken lines as virtual lines for easy understanding.

Also in accordance with the multi-core fiber 3 according to the embodiment, the effect of optical confinement on the cores 11 is improved, and it can be suppressed that light propagated through the cores 11a and 11b is leaked from each of the core elements 15a and 15b. Therefore, it is possible to further suppress the crosstalk between the cores adjacent to each other. Moreover, also in the embodiment, similarly to the second embodiment, it is possible to suppress an increase in the cutoff wavelength in any of the core elements.

As described above, the present invention is described as the embodiments are taken as examples. However, the present invention is not limited to the embodiments. For example, in the multi-core fibers 1, 2, and 3 illustrated in FIGS. 1, 4, and 5, the number of each of the entire cores is 12. However, it is fine that the number of the entire cores is an even number of 10 or greater as in the description above, and the number is not limited to the case where the number of the entire cores is 12. Moreover, it may be fine that in the multi-core fibers 1, 2, and 3, the refractive indexes and dimensions of the cores 11a and the cores 11b adjacent to each other, the core elements 10a and the core elements 10b, and the core elements 15a and the core elements 15b are not the same to one another.

EXAMPLES

In the following, the content of the present invention will be described more in detail as examples and comparative examples are taken, and the present invention is not limited to the examples.

Example 1

In the multi-core fiber according to the present invention, in the case where the number of the cores is 10, 12, 14, 16, and 18, $\phi$, a core pitch $\Lambda_{AB}$ between the cores on the inner circumferential side, a core pitch $\Lambda_{AC}$ between the core on the inner circumferential side and the core on the outer circumferential side, a distance R from the center of the cladding to the center of the core on the outer circumferential side, and an outer diameter d of the cladding, which are described in the embodiments, were measured for samples 1 to 20 whose conditions were changed from one another. It is noted that in the examples below, the distance (the outermost cladding thickness) from the center of the core on the outer circumferential side to the outer circumferential surface of the cladding was set to 35 μm. This result is shown in Table 2 below.

TABLE 2

| Sample | n | $\phi_{[deg]}$ | $\Lambda_{AB[\mu m]}$ | $\Lambda_{AC[\mu m]}$ | $R_{[\mu m]}$ | $D_{[\mu m]}$ |
| --- | --- | --- | --- | --- | --- | --- |
| 1 | 10 | 35.0 | 45.9 | 40.0 | 64.3 | 198.7 |
| 2 | 12 | 35.0 | 45.9 | 40.0 | 72.5 | 215.0 |
| 3 | 14 | 35.0 | 45.9 | 40.0 | 80.4 | 230.8 |
| 4 | 16 | 35.0 | 45.9 | 40.0 | 88.2 | 246.3 |
| 5 | 18 | 35.0 | 45.9 | 40.0 | 95.8 | 261.6 |
| 6 | 10 | 30.0 | 40.0 | 40.0 | 62.2 | 194.3 |
| 7 | 12 | 30.0 | 40.0 | 40.0 | 69.3 | 208.6 |
| 8 | 14 | 30.0 | 40.0 | 40.0 | 76.2 | 222.3 |
| 9 | 16 | 30.0 | 40.0 | 40.0 | 82.9 | 235.9 |
| 10 | 18 | 30.0 | 40.0 | 40.0 | 89.6 | 249.2 |
| 11 | 10 | 28.5 | 40.0 | 41.9 | 64.4 | 198.7 |
| 12 | 12 | 26.0 | 40.0 | 45.6 | 75.6 | 221.3 |
| 13 | 14 | 25.0 | 40.0 | 47.3 | 84.4 | 238.8 |
| 14 | 16 | 25.0 | 40.0 | 47.3 | 91.2 | 252.3 |
| 15 | 18 | 25.0 | 40.0 | 47.3 | 97.8 | 265.7 |
| 16 | 10 | 28.5 | 40.2 | 42.1 | 64.7 | 199.4 |
| 17 | 12 | 26.0 | 40.85 | 46.6 | 77.3 | 224.5 |
| 18 | 14 | 25.0 | 42.6 | 50.4 | 89.9 | 249.8 |
| 19 | 16 | 25.0 | 44.97 | 53.2 | 102.5 | 275.0 |
| 20 | 18 | 25.0 | 47.1 | 55.7 | 115.2 | 300.4 |

Comparative Example 1

Next, samples 21 to 25 were prepared using multi-core fibers in which the number of the cores was 10, 12, 14, 16, and 18, and all the cores were disposed in a regular polygonal shape. The core pitch between the cores adjacent to each other was set to 40 μm, the distance (the outermost cladding thickness) from the center of the core to the outer circumferential surface of the cladding was set to 35 μm similarly to the first embodiment, and the distance R from the center of the cladding to the center of the core and the outer diameter d of the cladding were measured. This result is shown in Table 3.

TABLE 3

| Sample | n | $R_{[\mu m]}$ | $D_{[\mu m]}$ |
| --- | --- | --- | --- |
| 21 | 10 | 64.72 | 199.4 |
| 22 | 12 | 77.27 | 224.5 |
| 23 | 14 | 89.88 | 249.8 |
| 24 | 16 | 102.52 | 275.0 |
| 25 | 18 | 115.18 | 300.4 |

As apparent from Tables 2 and 3, the result was shown that when the core pitch is the same between the closest cores adjacent to each other, the outer diameter of the cladding of the multi-core fiber according to example 1 is smaller than in the multi-core fiber of the comparative example, and when the outer diameter of the cladding is the same, the core pitch between the closest cores adjacent to each other of the multi-core fiber according to the present invention is greater than in the multi-core fiber according to comparative example 1. Therefore, in accordance with the multi-core fiber according to the present invention, it can be thought that crosstalk can be suppressed.

Example 2

Next, samples were prepared under the conditions shown in Table 4 below in which samples 26 to 28 were prepared using the multi-core fiber according to the second embodiment, and samples 29 to 31 were prepared using the multi-core fiber according to the first embodiment. Attenuations, mode field diameters, and effective areas were measured using light at wavelengths described in Table 4, cable cutoff wavelengths, zero dispersion wavelengths, and zero dispersion slopes were measured, and dispersions, bending losses at a bending radius of 7.5 mm, and crosstalk were measured using light at wavelengths described in Table 4. Here, for the optical properties other than dimensions, the mean values of all the cores were shown. It was observed that the cable cutoff wavelength of the core on the inner side was not long more specifically.

TABLE 4

| | | Sample | | | | | |
| --- | --- | --- | --- | --- | --- | --- | --- |
| | Wavelength$_{[nm]}$ | 26 | 27 | 28 | 29 | 30 | 31 |
| Fiber length$_{[m]}$ | — | 1550 | 1000 | 50000 | 1200 | 2500 | 2500 |
| Number of core | — | 12 | 12 | 12 | 12 | 12 | 10 |
| Fiber diameter$_{[\mu m]}$ | — | 225 | 209 | 230 | 213 | 199 | 183 |
| Sheath outer diameter$_{[\mu m]}$ | — | 335 | 335 | 340 | 333 | 319 | 325 |
| Core pitch$_{[\mu m]}$ | — | 44.7 | 41.5 | 44.6 | 41.4 | 39.9 | 39.9 |
| Outermost cladding thickness$_{[\mu m]}$ | — | 35.1 | 32.6 | 37.8 | 35.0 | 30.5 | 30.5 |
| $\phi_{[deg]}$ | — | 30.4 | 30.5 | 30.4 | 29.6 | 31.0 | 30.8 |
| Core $\Delta_{[\%]}$ | — | 0.32 | 0.32 | 0.23 | 0.4 | 0.7 | 0.7 |
| Trench $\Delta_{[\%]}$ | — | −0.7 | −0.7 | −0.7 | — | — | — |
| Attenuation$_{[dB/km]}$ | 1550 | 0.23 | 0.23 | 0.186 | 0.23 | 0.24 | 0.23 |
| | 1625 | 0.24 | 0.24 | 0.196 | 0.24 | 0.25 | 0.24 |
| Mode field diameter$_{[\mu m]}$ | 1550 | 10.0 | 9.8 | 11.7 | 9.7 | 7.4 | 7.3 |
| | 1625 | 10.3 | 10.0 | 12.1 | 10.2 | 7.6 | 7.5 |
| Effective area$_{[\mu m^2]}$ | 1550 | 78.0 | 74.6 | 105.8 | 72.4 | 42.2 | 41.0 |
| | 1625 | 82.2 | 78.4 | 112.0 | 76.6 | 45.1 | 43.1 |
| Cable cutoff wavelength$_{[\mu m]}$ | — | 1.37 | 1.26 | 1.43 | 1.28 | 1.35 | 1.35 |

TABLE 4-continued

| Wavelength[nm] | Sample 26 | 27 | 28 | 29 | 30 | 31 |
|---|---|---|---|---|---|---|
| Zero dispersion wavelength[nm] | — | 1301 | 1298 | 1299 | 1314 | 1350 | 1348 |
| Zero dispersion scope[ps/nm²/km] | — | 0.094 | 0.095 | 0.096 | 0.085 | 0.074 | 0.074 |
| Dispersion[ps/nm/km] | 1550 | 19.3 | 19.4 | 19.6 | 16.4 | 12.3 | 12.1 |
| Bending loss[dB/m] | 1625 | 0.04 | 0.21 | 0.50 | 17 | 0.02 | 0.03 |
| Crosstalk[dB/100 km] | 1625 | −58.5 | −44.8 | −43.1 | −13.1 | −38.5 | −38.9 |

As apparent from Table 4, a result was shown that in accordance with the multi-core fiber according to the second embodiment, crosstalk can be further decreased as compared with the multi-core fiber according to the first embodiment.

As described above, according to the present invention, a multi-core fiber that can suppress crosstalk is provided, and can be excellently used for communication cables and the like.

REFERENCE SIGNS LIST 1, 2, 3 . . . multi-core fiber
10a, 10b . . . core element
11a, 11b . . . core
12 . . . inner cladding layer
13, 14 . . . low refractive index layer
15a, 15b . . . core element
17 . . . low refractive index portion
20 . . . cladding
31 . . . inner protective layer
32 . . . outer protective layer
C . . . apex
Ci . . . circle
Lc . . . straight line
LV . . . perpendicular bisector
O . . . origin point
RP . . . regular polygon

The invention claimed is:

1. A multi-core fiber comprising:
an even number of cores, wherein said even number is at least ten; and
a cladding surrounding the core, wherein
in the even number of cores, a half of the cores are disposed in a manner that centers are located on apexes of a regular polygon whose center is at an origin point in the cladding,
in the even number of cores, other cores other than the half of the cores are disposed in a manner that centers are located on perpendicular bisectors of edges of the regular polygon on an inner side of the regular polygon, wherein no core is disposed at the origin point in the cladding, and
an expression below is satisfied where a number of the even number of cores is defined as n and a size of an acute angle formed of a line connecting a center of a core on which attention is focused in the half of the cores to a center of a core in the other cores adjacent to the core on which attention is focused and a line connecting the center of the core on which attention is focused to the origin point is defined as φ, wherein the n is a number other than 12 and the φ is an angle other than 30°

$$\tan^{-1}\left(\frac{\tan\frac{360°}{n}\cdot\sin\frac{360°}{2n}}{\tan\frac{360°}{n}-\sin\frac{360°}{2n}}\right) < \phi < 90° - \frac{540°}{n}.$$

2. The multi-core fiber according to claim 1, wherein each of the cores is surrounded by an inner cladding layer whose refractive index is lower than a refractive index of the core, and a low refractive index layer whose average refractive index is lower than refractive indexes of the cladding and the inner cladding layer, the low refractive index layer being surrounded by the cladding together with the inner cladding layer.

3. The multi-core fiber according to claim 2, wherein the low refractive index layer is formed of materials of a refractive index lower than the refractive indexes of the cladding and the inner cladding layer.

4. The multi-core fiber according to claim 3, wherein each of the cores is formed of pure silica.

5. The multi-core fiber according to claim 2, wherein the low refractive index layer is formed in a manner that a plurality of low refractive index portions is formed to surround the inner cladding layer in a material whose refractive index is the same as the refractive index of the cladding, the low refractive index portion having a refractive index lower than the refractive index of the inner cladding layer.

6. The multi-core fiber according to claim 1, wherein an outer diameter of the cladding is 230 μm or less.

* * * * *